US009441537B2

United States Patent
Filip et al.

(10) Patent No.: US 9,441,537 B2
(45) Date of Patent: Sep. 13, 2016

(54) METHOD AND DEVICE FOR PERFORMING OPEN-LOOP AND CLOSED-LOOP CONTROL OF AN INTERNAL COMBUSTION ENGINE GENERATOR SYSTEM

(75) Inventors: Gerhard Filip, Markdorf (DE); Claus-Oliver Schmalzing, Bad Waldsee (DE); Hans-Juergen Thomas, Immenstaad (DE); Tobias Kohl, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 361 days.

(21) Appl. No.: 14/118,437

(22) PCT Filed: May 15, 2012

(86) PCT No.: PCT/EP2012/002082
§ 371 (c)(1),
(2), (4) Date: Jun. 16, 2014

(87) PCT Pub. No.: WO2012/156078
PCT Pub. Date: Nov. 22, 2012

(65) Prior Publication Data
US 2014/0290591 A1    Oct. 2, 2014

(30) Foreign Application Priority Data

May 18, 2011    (DE) .......................... 10 2011 076 073

(51) Int. Cl.
F02B 63/00    (2006.01)
F02B 63/04    (2006.01)
(Continued)

(52) U.S. Cl.
CPC ................ *F02B 63/04* (2013.01); *B60L 11/08* (2013.01); *B63H 21/21* (2013.01); *B63J 3/00* (2013.01);
(Continued)

(58) Field of Classification Search
CPC  F02B 63/04; F02B 2063/045; F02B 63/044; F02B 77/13; F02B 75/16
USPC .......................................................... 123/2
See application file for complete search history.

(56) References Cited

U.S. PATENT DOCUMENTS 6,066,897 A    5/2000 Nakamura
6,397,821 B1    6/2002 Spagele et al.
(Continued)

FOREIGN PATENT DOCUMENTS

CN    1769651 A    5/2006
DE    19937139 C1    4/2001
(Continued)

OTHER PUBLICATIONS

PCT International Search Report dated Jan. 25, 2013 for PCT/EP2012/002082.
(Continued)

*Primary Examiner* — Lindsay Low
*Assistant Examiner* — Charles Brauch
(74) *Attorney, Agent, or Firm* — Reising Ethington, P.C.

(57) ABSTRACT

The exemplary illustrations generally include a method for controlling and regulating an internal combustion engine-generator system 1000 with a plurality of internal combustion engine-generator units 400 generating electric power which can be connected to a distribution grid and load consumers 200 consuming electric power, with a unit 400 comprising an internal combustion engine 401, 402, 404-408 with variable engine speeds and a generator 421-428, characterized in the steps: determining a given operating state Z* of the internal combustion engine 401, 402, 404-408 of at least one internal combustion engine-generator unit 400; deducting a range of operating states ZB* describing an electric load override $L^{adm}$ depending on the given operating state Z* for the internal combustion engine of at least one internal combustion engine-generator unit 400, with the determination of the given operating state Z* and the deduction of the range of operating range ZB* occurring based on the calculation model 504 for the internal combustion engines 401, 402, 404-408; providing a scope of load requirements describing potential load requirements of a plurality of load consumers 200.

27 Claims, 4 Drawing Sheets

(51) Int. Cl.
  *F02D 25/00*  (2006.01)
  *F02D 29/06*  (2006.01)
  *F02D 41/02*  (2006.01)
  *H02J 4/00*  (2006.01)
  *B60L 11/08*  (2006.01)
  *B63J 3/00*  (2006.01)
  *B63H 21/21*  (2006.01)
  *F02B 77/13*  (2006.01)
  *F02B 75/16*  (2006.01)
  *F02D 41/14*  (2006.01)

(52) U.S. Cl.
  CPC ............... *F02D 25/00* (2013.01); *F02D 29/06* (2013.01); *F02D 41/0205* (2013.01); *H02J 4/00* (2013.01); *B60L 2200/32* (2013.01); *F02B 75/16* (2013.01); *F02B 77/13* (2013.01); *F02D 2041/1433* (2013.01); *Y02T 10/70* (2013.01); *Y02T 10/7077* (2013.01)

(56) References Cited

U.S. PATENT DOCUMENTS

| | | | |
|---|---|---|---|
| 7,121,257 B2 | 10/2006 | Dolker | |
| 7,182,064 B2 | 2/2007 | Dolker et al. | |
| 7,974,763 B2 | 7/2011 | Hauschild et al. | |
| 8,000,866 B2 | 8/2011 | Heap et al. | |
| 8,151,555 B2 | 4/2012 | Niimi et al. | |
| 2010/0109344 A1* | 5/2010 | Conway et al. | F02B 63/04 290/40 A |
| 2012/0129411 A1 | 5/2012 | Kodera et al. | |

FOREIGN PATENT DOCUMENTS

| | | |
|---|---|---|
| DE | 10302263 B3 | 3/2004 |
| DE | 102004015973 B3 | 10/2005 |
| DE | 102009036277 A1 | 2/2011 |
| EP | 1914162 A1 | 4/2008 |
| JP | 2011063256 A | 3/2011 |
| WO | WO-2011011806 A1 | 2/2011 |

OTHER PUBLICATIONS

English Language Abstract for DE 10 2009 036277.
English Language Abstract for WO 2011/011806.

\* cited by examiner

METHOD AND DEVICE FOR PERFORMING OPEN-LOOP AND CLOSED-LOOP CONTROL OF AN INTERNAL COMBUSTION ENGINE GENERATOR SYSTEM

CROSS REFERENCE TO RELATED APPLICATIONS

This application is a National Phase Application related to PCT/EP2012/002082 filed on May 15, 2012, which application claims priority to DE 10 2011 076 073.3 filed on May 18, 2011, which applications are incorporated herein by reference in their entirety.

TECHNICAL FIELD

The present disclosure relates to a method for controlling and regulating an internal combustion engine-generator system. The present disclosure further relates to a device for controlling and regulating an internal combustion engine-generator system and an internal combustion engine-generator system. The present disclosure also relates to a land vehicle or watercraft and a stationary facility to generate electric energy with an internal combustion engine-generator system.

BACKGROUND

An internal combustion engine-generator system of the type mentioned at the outset generally comprises a plurality of internal combustion engine-generator units, which generate electric power and can be connected to a distribution grid. Additionally, load consumers consuming electric power are connected via the distribution grid, which consume as load the electric power generated by the internal combustion engine-generator units. The above-mentioned internal combustion engine-generator unit comprises an internal combustion engine with variable engine speeds and a generator. Such internal combustion engine-generator systems are used in large vehicles, e.g. land vehicles or watercraft, but also as stationary systems. In general, an internal combustion engine-generator unit has the function of a power generator, which e.g. couples a motor and a generator for driving the generator, perhaps via a transmission, with the generator in turn generating power.

Commonly a diesel engine is operated in a power generator, to the extent possible with constant engine speed. Due to the fact that a diesel engine can also be operated at higher engine speeds than the common 1500 and/or 1800 rpm, and thus can yield more power, it is also common in certain limited operating situations to allow operation with variable engine speeds via power-electric measures. In this case a frequency of the electric power provided by the generator and dependent on the engine speed of the internal combustion engine is first rectified and then inverted into the frequency of the power generator desired for the distribution grid. In particular in such a case, the internal combustion engine, particularly a diesel engine, is operated according to predetermined characteristics, which state the power output allocated to each engine speed. Such characteristics commonly extend at a safe distance from the engine speed or the torque representing the maximum capacity, which can be stated via a so-called DBR and/or MCR-curve of a diesel engine. This way it is ensured that an appropriate power reserve is maintained for the diesel engine, which shall serve to render available sufficient power reserves at the diesel engine for variable loads. However, such an operation of a diesel engine is not optimal with regards to consumption when operated regularly.

For example, from DE 199 37 139 C1 a method is known for controlling an internal combustion engine, which actually shall be operated stationary, in which upon detection of a significant reduction in load at the driven side the start of injection is adjusted to a later point of time. The engine speed limit curve provided here to limit the target injection rate limits the adjustment range in the stationary operating state. From DE 103 02 263 B3 a method is known in which in the stationary operating state the target injection rate is limited via a first engine speed limit curve. Upon detection of a dynamic operating state, a second engine speed limit curve is switched to.

It is ideal to optimally operate an internal combustion engine, particularly a diesel engine, within the scope of an internal combustion engine-generator unit as a part of an internal combustion engine-generator system, for example with relatively good specific fuel consumption and yet still sufficiently strong electric load override.

In an internal combustion engine-generator system with parallel operation of a plurality of internal combustion engine-generator units, also called GENSET, their respective operating points can be generally optimized due to the above-mentioned independence of power output and engine speeds in a diesel engine. In such parallel operation of several power generators for example, the capacity is distributed to the units, e.g. according to the nominal power output of the diesel engines, and load changes are also distributed over the units. In common controls, within the scope of switching on or off, generally the problem of over-oscillation can occur. This can be partially corrected in a so-called "P-level control", as described for example in DE 10 2004 015 973 B3 of the applicant. Here, higher power output is adjusted by the operator via the increase of the predetermined target engine speed and a higher target injection rate leads to a higher power output of the internal combustion engine. Here, it is also provided that an increase of the predetermined target engine speed causes a shift of the engine speed limit curve to a faster actual engine speed. In one example it is suggested that a governor control curve of the engine speed limit curve can be modified via the "P-level". Consequently the stationary operating points of the diesel engines of the power generator then show sufficient distance from the limit curve (DBR-curve) so that load increases and load changes can be compensated. The above-mentioned process has been proven for the generally stationary operation and in generally predetermined load changes, which are set for example in standards and regulations.

In general, all of the above-mentioned concepts are suitable only to a limited extent for dynamic, internal combustion engine-generator systems with strong variations in engine speeds, i.e. actually constantly operating for example in transient mode, and the internal combustion engine-generator units networked here.

SUMMARY

This is the starting point of the exemplary illustrations discussed further below, with one objective being to provide a method for controlling and regulating of the above-mentioned type in an improved manner for a transient operation of an internal combustion engine-generator system. In particular, perhaps in consideration of proven concepts for the stationary operation known per se, a method shall be provided for controlling and regulating an internal combustion engine-generator system which, particularly for the transient operation, provides sufficient power reserves for the system and/or the unit and on the other hand allows an optimized operation of the system and/or the unit. In particular, the method shall provide the option to select an optimization instruction depending on the convenience and needs of the user. Another objective of the examples provided herein is also to provide a suitable device for executing the method.

The above-described objective regarding the method is attained in a method of the type mentioned at the outset, as well as the steps of the methods according to the exemplary illustrations are provided in further detail below. In order to attain this objective with regards to the device, exemplary illustrations are also provided below which are directed to a device for controlling and regulating.

In order to attain the above-described objective with regards to the device, the exemplary illustrations also lead to an internal combustion engine-generator system with a plurality of internal combustion engine-generator units generating electric power, which can be connected to a distribution grid, and load consumers consuming electric power, with one unit comprising an internal combustion engine with variable engine speeds and a generator and being provided with a device for controlling and regulating according to this concept of the exemplary illustrations.

In general, an internal combustion engine refers to any kind of motor or similar machine driven by internal combustion. In the present case one concept of the exemplary illustrations can be implemented in a particularly effective fashion by a diesel engine, which however shall not be considered limiting here. An internal combustion engine-generator unit shall particularly relate to a motorized power generator, particularly a diesel engine-power generator. An internal combustion engine-generator system shall particularly relate to an internal combustion engine-generator facility in which several internal combustion engine-generator units can be operated in parallel.

The exemplary illustrations also include a land vehicle or watercraft with an internal combustion engine-generator system of the above-mentioned type. More specifically, a land vehicle may be an all-purpose vehicle or a utility vehicle. One watercraft in which the internal combustion engine-generator system according to the exemplary illustrations has particularly been proven is e.g. a yacht, in particular a so-called mega-yacht. As an example, in the following description examples are explained in greater detail based on an internal combustion engine-generator system for a mega-yacht with reference to the drawing.

The exemplary illustrations also include a stationary facility for generating electric power with an internal combustion engine-generator system.

The exemplary illustration also recognize that, in prior art, providing to a system and/or a unit within the system electric load override and an optimization of the operating state seemed impossible in consideration of given operating states and/or present load requirements in a continuously transient state.

With regards to some exemplary methods described further below, the steps (a) and (b) generally include:
(a) Determining a given operating state ($Z^*$) of the internal combustion engine of at least one internal combustion engine-generator unit;
(b) Deducting an electric load override ($L^{adm}$) depending on the range of operating states ($ZB^*$) describing the given operating state $Z^*$ for the internal combustion engine of at least one internal combustion engine-generator unit.

According to the exemplary illustrations, it is provided that the determination of the given operating state ($Z^*$) and the deduction of the given range of operating states ($ZB^*$) occur based on a calculation model for the internal combustion engine.

The examples discussed herein are generally based on the thought that the transient behavior of diesel engines in a dynamic operating state and the electric load override of a diesel engine characterizing the power reserve connected thereto may depend on a number of different parameters. These parameters may include, for example, the given power output, the given engine speed, and the temperature of the engine, but also its ambient temperature, the air pressure, etc. In general, in all complexity of the operation of a diesel engine with variable engine speeds it has shown that a comparatively good specific fuel consumption of the diesel engine is given slightly below, if applicable even slightly above its predetermined power output limit, essentially set for the stationary operation, i.e. particularly in the range near the above-mentioned DBR and/or MCR curve. However, the diesel engine should not be permanently operated beyond the MCR curve. The exemplary illustrations are further based on the thought that a diesel engine can assume relatively good specific fuel consumption precisely when it naturally shows only a relatively low electric load override and thus shows only a relatively minor acceleration. The exemplary illustrations generally recognize that it spite thereof, an optimized operation, i.e. for example with comparatively good specific fuel consumption and yet sufficiently large electric load override, can be achieved within the scope of a suitable calculation-based control.

In short, in one aspect the exemplary illustrations provide a model-based control by which an internal combustion engine, for example a diesel engine, can be stimulated comparatively precisely, particularly in the transient operation. Using the calculation model, not only can the given transient status ($Z^*$) of the internal combustion engine of an internal combustion engine-generator unit be determined, but additionally a range of operating states ($ZB^*$) and thus an electric load override ($L^{adm}$) available at least generally can be deduced from the given operating state ($Z^*$). Due to the concepts of the exemplary illustrations, the operating state and the electric load override of a diesel engine available for the operating state are known, for example practically at every state, of even a transient operation of a device for controlling and regulating the internal combustion engine-generator system.

With regards to the device for controlling and regulating, it is provided according to the exemplary illustrations that appropriate control and processor means are implemented for determining the given operating state and for deducting the electric load override based on the calculation model, e.g., in a second partial control allocated to the internal combustion engine with variable engine speeds.

This approach of this concept of the exemplary illustrations forms the foundation for the fact that the device for controlling and regulating the internal combustion engine, e.g., a diesel-operated internal combustion engine, for example a diesel engine, can be operated depending on the expected load requirements of load consumers and yet at an optimal operating point, thus with sufficient electric load override and still in an optimized fashion, e.g., upon respectively selecting a certain suitable optimization strategy.

Exemplary methods may provide for an additional step (c), namely (c) providing a scope of load requirements describing potential load requirements of the plurality of load consumers.

With reference to the device according to the exemplary illustrations for controlling and regulating the internal combustion engine-generator system, it is here provided according to the exemplary illustrations that appropriate control and processor means are implemented for the step (c), for example in a first partial control superseding the system.

In this aspect of the exemplary illustrations, a foundation is provided for a secure operation of, for example, a diesel engine, depending on the given operating state ($Z^*$), within the scope of the electric load override ($L^{adm}$) known from the range of operating state ($ZB^*$), whereby both the stationary as well as the transient operation can be optimized here in said range of operation state. In other words, in this aspect of the exemplary illustrations, a chance is provided for a transient operation of an internal combustion engine-generator system to adjust a safe and simultaneously, considering the framework conditions, optimally selected operating point for the internal combustion engine-generator system and/or for the individual internal combustion engine-generator units, particularly to continuously readjust it.

In a particularly advantageous fashion, an above-mentioned method is provided for controlling and regulating in a control circuit, in which a given operating state and a range of operating states ($Z^*$, $ZB^*$) can be continuously and repeatedly determined so that the method for controlling and regulating is capable of readjusting even comparatively highly dynamic operating states of internal combustion engines within the scope of an internal combustion engine-generator system, while securing sufficient electric load override and optimized operating aspects.

Advantageously, in the above-mentioned method for controlling and regulating, any load shedding or emergency operation of the internal combustion engine-generator system is indeed necessary only in exceptional situations, namely limited to a real overload range of the internal combustion engine-generator system.

Advantageous further developments of the exemplary illustrations are discernible from the discussion below and the dependent claims, and provide in detail advantageous options for realizing the above-explained concept within the scope of the objective as well as with regards to additional advantages.

Within the scope of another exemplary illustration, it is additionally provided that (d), in consideration of the given operating state and the electric load override of the internal combustion engine of at least one internal combustion engine-generator system:

a plurality of internal combustion engine-generator units to be connected to the distribution grid is determined depending on the scope of load requirements, and a variable load distribution and a variable distribution of engine speeds to the plurality of internal combustion engines of the plurality of internal combustion engine-generator units are determined depending on the scope of load requirements.

The scope of load requirements may therefore be essentially fulfilled within the scope of a variable load distribution and distribution of engine speeds, whereby the load distribution shall reflect the required electric load override to the extent possible, which shall be distributed to the individual engines of the internal combustion engine-generator units according to the scope of load requirements. In particular, it is not only determined here if an additional engine is required, but it may also be calculated if an engine can be shut down.

With regards to the device for controlling and regulating the internal combustion engine-generator system, it may be advantageously further provided that appropriate control and processor means are implemented for step (c) and additionally (d) in a first partial control superseding the system.

In short, another aspect of an exemplary illustration further includes a first partial control at the system level overlapping the above-mentioned second partial control on the level of the internal combustion engine. On the one hand the first partial control is provided in order to determine the given operating state ($Z^*$) and deduct therefrom the range of operating states ($ZB^*$) relevant for the electric load override, for example with the help of a digital signal processor and based on a model. This information is also provided to the second partial control, which uses it together with the information of a scope of load requirements to determine the number of required internal combustion engine-generator units. In particular, the second partial control is also designed to distribute the loads and engine speeds depending on the scope of load requirements to the necessary internal combustion engine-generator units.

According to another exemplary illustration, particularly in the second partial control regarding the internal combustion engine with variable engine speeds, it is inquired if a value of a variable load distribution in reference to the inquired unit is within a permissible range of operating states of the internal combustion engine describing the electric load override in reference to the given operating state. Depending on the result of such an inquiry, it has proven advantageous, if applicable, to change the engine speed of the internal combustion engine such that a new operating state ($Z^*$) of the internal combustion engine returns to a preferred position within a permitted range of operating states ($ZB^*$), i.e. showing sufficient electric load override ($L^{adm}$).

In particular, in an inquiry serving a further development of this process, another parameter determining the operating state of the internal combustion engine can also be changed. This measure can also ensure that the new operating state ($Z^*$) of the internal combustion engine is placed within a permissible range of operating states ($ZB^*$), such that sufficient electric load override ($L^{adm}$) is available in order to meet the value of a variable load distribution allocated to the inquired unit, even in case of a transient operating state.

In a particularly advantageous fashion, the method comprises the additional step: (e) comparing the electric load override with the variable load distribution for the internal combustion engine, which is dependent on the scope of load requirements.

The processing step (e) can be implemented particularly advantageously in the second partial control concerning to the internal combustion engine with variable engine speeds.

Furthermore, it has proven particularly advantageous to characterize an electric load override at a given operating state ($Z^*$) by essentially at least two parameters describing the transient development of the power output. The use of a power leap ($\Delta P$) on the one side and the use of a power ramp ($\delta P$) on the other side has proven particularly advantageous. Here, a power leap ($\Delta P$) is to be understood a power value, which shall be available practically instantly within a relatively short period of time. A power ramp ($\delta P$) shall be understood as a power value, which can be approached within a predetermined acceptable period of time, e.g., via a control ramp with a defined end point and incline, thus not at the earliest possible time but available only after a certain period of time, which is considerably longer than the time available for a power leap. In this regard, a power leap and a power ramp may relate the same value of power to be provided. However, in a power leap this must be available practically instantly at the earliest possible point of time and in a power ramp this may be adjusted in a defined fashion over an extended period of time.

The parameters of a power leap and a power ramp can be defined within the range of operating states (ZB*) for the internal combustion engine describing the electric load override ($L^{adm}$). In this regard, a range of operating states (ZB*) can also be considered a maximum possible value of a status parameter and an electric load override ($L^{adm}$) as a perhaps equal or lower permissible value of a status parameter for an operating state (Z*). The further developed concept here offers an advantageous foundation to adjust an operating state (Z*) of an internal combustion engine such that, even after a power leap or a power ramp, it still shows sufficient distance from the limits of the range of operating states (ZB*). In this further development, a maximum possible value of a status parameter insofar represents a value describing the limits of the range of operating states.

The above-mentioned comparing inquiry between the electric load override and the load distribution may be performed in the second partial control related to the internal combustion engine with variable engine speeds in a particularly advantageous fashion in the form of a comparison between a permissible power leap and/or a permissible power ramp on the one side, and a power leap and/or power ramp requested due to the variable load distribution on the other side.

It has proven advantageous particularly within the scope of a superseding first partial control related to the system to determine the number of internal combustion engine-generator units to be connected to the distribution grid. This occurs beneficially within the scope of the first partial control depending on the scope of requirements. For this purpose it may be particularly advantageous to perform in the first partial control a comparison of the total loads of the consumers with the total power output of the internal combustion engine-generator units. Advantageously, initially only a comparison of the total loads of the load consumers occurs with the given total power output of the internal combustion engine-generator units. If a trend is detected here that the total loads of the load consumers are higher than the given total power output of the internal combustion engines, a further development provides that the number of internal combustion engine-generator units connected to the distribution grid is increased at an early time. This way, any potential overload of the system can be detected early and avoided.

If the number of required internal combustion engine-generator units is fixed here, a load distribution and/or a distribution of engine speeds can be performed.

In one exemplary illustration, a summary framework condition can be defined for the first superseding partial control concerning the system, which advantageously serves to support an optimized operating point of the entire internal combustion engine-generator system. In particular, it has proven beneficial that generally the determination of a variable load distribution and distribution of engine speeds is subjected to a summary framework condition. Here, it is advantageously demanded that the total of all electric load overrides of the internal combustion engines, based on the calculation model, is greater than the scope of load requirements of the total of load consumers. The adjustment of a variable load distribution and/or a variable distribution of engine speeds based on the above-mentioned summary framework condition therefore ensures reliably the operation of the entire internal combustion engine-generator system with sufficient electric load override on the one hand, as well as at an optimized operating point on the other hand.

For example, under the further developed definition of the scope of load requirements in the above-mentioned fashion, the summary framework condition can be formed such that the sums of all individually possible power leaps is greater than a maximum of load leaps of the total of load consumers. Additionally, in another example, the summary framework condition can be formed such that the sum of all individually possible power ramps is greater than a superseding value of the load ramps.

In this context and in general, it has proven particularly advantageous that a load requirement of at least one load consumer is determined by an effective load $P^L$, a load leap ($\Delta P^L$), and a load ramp ($\delta P^L$). This way, in one exemplary illustration a scope of load requirements of the plurality of load consumers can be determined; for example via a sum of effective loads (SUM($P_i^L$)) as well as a maximum of the load leaps (MAX($\Delta P_i^L$)) as well as a superseding value of the load ramps (RESBL($\delta P_i^L$)) on a total (i) of load consumers. The latter superseding value can for example represent an appropriate value of a load ramp for the entire system, reasonable according to common operating conditions.

Overall, according to one of the above-mentioned further developments or combinations thereof, not only is the internal combustion engine-generator system operated in its entirety with sufficient electric load override and at an optimized operating state, but furthermore every individual internal combustion engine-generator unit of the system is operated with sufficient electric load override and at an optimized operating state. Due to the implemented calculation model, these advantages are not only achieved for a largely stationary operation of the system and/or a unit of the system. Rather, a control and regulation method and/or a control and regulation device are designed to engage according to the exemplary illustrations particularly in a transient operation of a unit and/or the entire system. In one exemplary illustration, the success of the concept is based on the fact that, in the internal combustion engine with variable engine speeds, the engine speed and the power output can be independently adjusted to a limited extent. In particular it has proven advantageous that, in a second partial control, the engine speed of the internal combustion engine is adjusted with variable engine speeds. The power output of an internal combustion engine can be adjusted within the scope of load distribution in a first partial control.

In particular, it has proven advantageous that the engine speed of the internal combustion engine and/or another parameter characterizing the operating state is changed if one value of a variable load distribution allocated to the requested unit results in the present operating state (Z*) changing into a new operating state, which was outside a permissible or possible range of operating states (ZB*) of the internal combustion engine including the electric load override. The engine speed of the internal combustion engine and/or another parameter characterizing the operating state can also be changed if the control and regulation method detects a not yet optimized parameter of the calculation model. In this case the method can advantageously detect and implement further needs for optimization.

It is particularly advantageous if an optimization strategy is predetermined for the implementation of the control and regulation method for the first and/or second partial control. Under its framework condition, advantageously within a permitted or possible range of operating states (ZB*), a new operating state (Z*) of the internal combustion engine can be adjusted which also meets the framework conditions predetermined by the optimization strategy. An optimization strategy for example can be defined by predetermining framework conditions for minimized costs of life cycles. Another optimization strategy can for example be set by predetermining the framework conditions for minimal fuel consumption. Another optimization strategy can for example be set by predetermining framework conditions regarding a maximized availability of the internal combustion engine. Another optimization strategy can be set for example by predetermining framework conditions for a minimized signature. Such and other parameter settings can be predetermined or selected for example by user inputs into the device for controlling and regulating the internal combustion engine-generator system.

Depending on the requirements of a dynamic timetable for a transient operating state of the internal combustion engine-generator system, a control circuit must be run for the first and/or second partial control. The above-mentioned steps a) to d) as well as optionally the steps mentioned in the further developments, e.g. step e) in the method for controlling and regulating the internal combustion engine-generator system are repeated more or less frequently depending on the dynamic of the transient operating state.

In particular, according to another aspect of an exemplary illustration, e.g., the calculation-based determination of the given operating state (Z*) and a deduction of an electric load override ($L^{adm}$) is repeated relatively frequently depending on the given operating state (Z*) in order to allow considering relevant changes of the status of the internal combustion engine in the transient operation. The repetition of further above-mentioned steps then serves to the renewed approaching of the operating state provided with sufficient electric load override and/or an optimized operating state with regards to an optional optimization strategy. As a result, this may lead to a continuous readjustment of the system and/or the units of said system according to an exemplary illustration.

For the calculation model itself, a thermodynamic model at the operating state of the internal combustion engine has proven advantageous. The thermodynamic calculation model considers in one exemplary illustration a number of status parameters, which are selected from a group comprising: power output, engine speed, and temperature of the internal combustion engine, ambient temperature and ambient pressure, exhaust counter-pressure, as well as moment of inertia and specific fuel consumption of the internal combustion engine-generator unit. In general, not all but rather an arbitrary number of these status parameters can be used individually or in any combination in order to define a given operating state (Z*) of the internal combustion engine. The consideration of at least all of the above-stated status parameters is advantageous for a sufficient definition of the operating state of the internal combustion engine; for certain control aspects, however, a specific selection of two or more certain status parameters has proven beneficial in other exemplary approaches. This may relate particularly to the combination of the status parameters power output and engine speed of the internal combustion engine or power output and temperature of the internal combustion engine or a combination of engine speed and temperature of the internal combustion engine.

In the following, exemplary illustrations are described based on the drawings. They shall illustrate examples, not necessary true to scale, rather the drawings are embodied in a schematic and/or slightly distorted form where this serves explanatory purposes. With regards to additions directly discernible from the drawing, reference is made to the relevant prior art. Here it must be considered that a plurality of modifications and alterations with regards to the form and the detail of an exemplary illustration can be performed without deviating from the general idea of the exemplary illustrations. The features of the particular examples disclosed in the description, the drawing, and the claims can be utilized both individually as well as in arbitrary combinations for the further development of the exemplary illustrations. Additionally, the scope of the exemplary illustrations includes all combinations of at least two of the features disclosed in the description, the drawing, and/or the claims. The general ideas included in the disclosure of the exemplary illustrations are not limited to the precise form or the detail of the examples shown and described in the following or limited to an object, which would be limiting compared to the object claimed in the claims. With regards to ranges stated, any values within the limits mentioned shall be considered disclosed as thresholds and can be used and claimed arbitrarily.

BRIEF DESCRIPTION OF THE DRAWINGS

Additional advantages, features, and details of the exemplary illustrations are discernible from the following description of the exemplary illustrations as well as from the drawing; in detail the drawings show.

DETAILED DESCRIPTION

Figure 1:
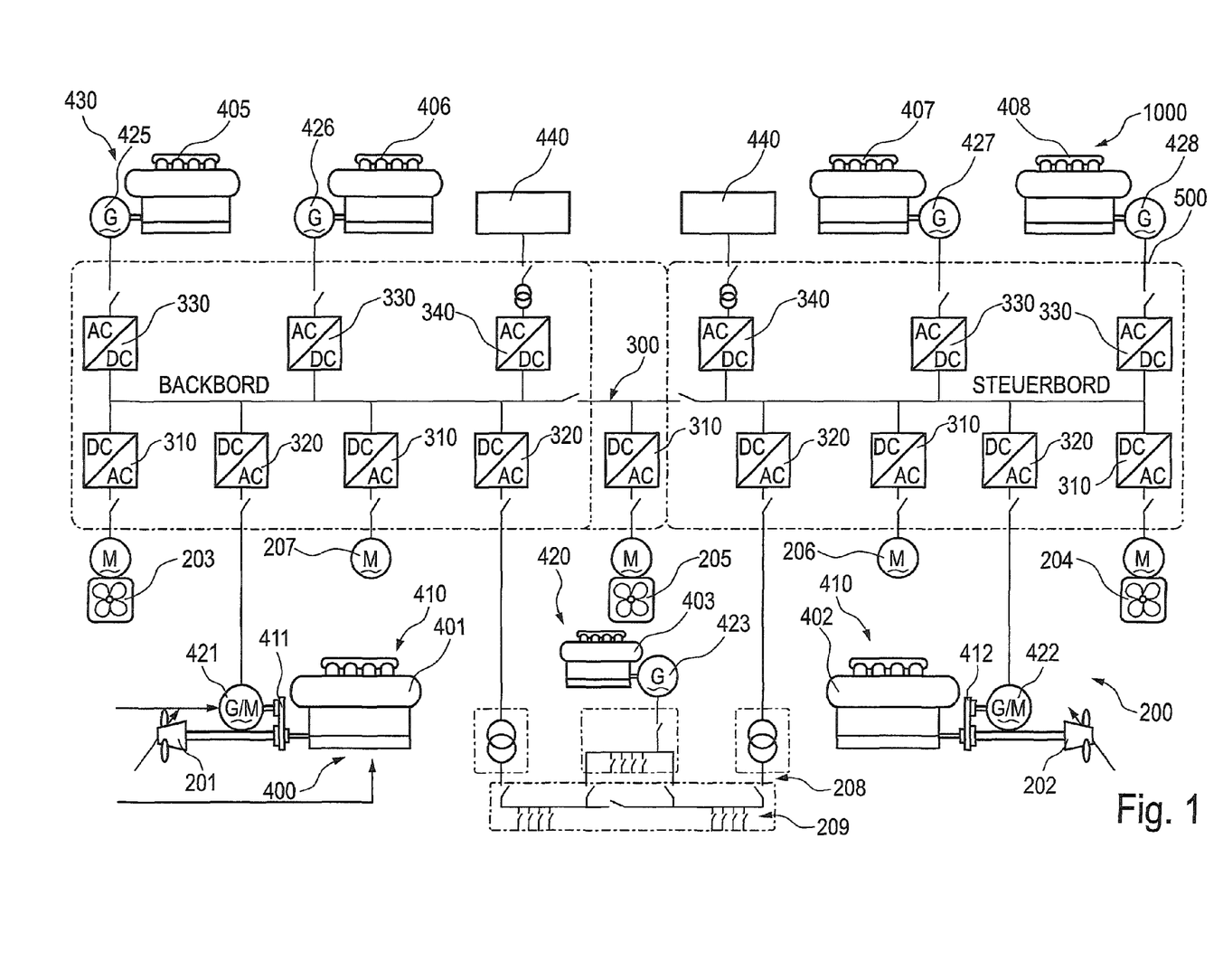
FIG. 1 a schematic illustration of an exemplary illustration of an internal combustion engine-generator system for a mega-yacht, which comprises a plurality of internal combustion engine-generator units of various types generating electric power, which can be connected via inverters to a distribution grid, and which comprises different load consumers consuming electric power, which can be also connected via inverters to the distribution grid; in the present example each unit comprises an internal combustion engine with variable engine speeds and a generator.

FIG. 1 shows in an exemplary fashion an internal combustion engine-generator system 1000 for a mega-yacht, which is designed for driving it. As a load consumer consuming power, in the following in their entirety generally marked 200, several propellers are connected to the distribution grid 300 of the system 1000, namely a main portside propeller 201, a main starboard propeller 202, as well as a port propeller 203 for a bow thruster, and a portside propeller 204 for a bow thruster as well as a propeller 205 for a stern thruster. Additionally, drives 206, 207 are provided for a starboard cooling system and a portside cooling system as further load consumers 200. The above-mentioned load consumers 200 can be connected via inverters 310 (DC/AC inverters) to the distribution grid 300, which transform the direct current, usually provided in the distribution grid, via inverters into alternating current of the desired frequency. The above statements apply generally also for the load consumers 200, connected via inverters 320 (DC/AC inverters) to the distribution grid 300, in the form of the main portside propeller 201, the main starboard propeller 302 and, with limitations, also the emergency power system 208 with the electric grid 209. The emergency power facility 208 subject to particular requirements and standards with the internal combustion engine-generator unit 403 and the generator 423 is generally operated as a "stand alone" system and is therefore in general only to a limited extent considered a part of the control and regulating method described in the following.

Furthermore, the load consumers 200 can be directly driven via a separate internal combustion engine-generator unit, similar to the other ones also in the form of a power generator with a diesel engine. For this purpose, in the following the plurality of internal combustion engine-generator units 400 is described in detail, which can be connected via inverters 320 to the distribution grid 300. This particularly includes the portside internal combustion engine-generator unit 401 and the starboard internal combustion engine-generator unit 402, which form the primary drive for the main propellers 201, 202. Here, one main propeller 201, 202 is coupled to an internal combustion engine-generator unit 401, 402 forming the primary drive via a gear assembly 411, 412 to an allocated generator 421, 422. Accordingly, during the operation of a diesel engine 401, 402 it can serve for the exclusive power generation when its power generated by the generator 421, 422 is fed via the inverter 320 into the distribution grid. Via the gear assembly 411, 412 a propeller 201, 202 can also be driven directly via a diesel engine 401, 402 in a pure mechanical fashion or combined electromechanically. The internal combustion engine-generator unit 401, 402 operates as a pure power generator when the diesel engine 401, 402 exclusively drives the generator as an electric engine without driving the propeller 201, 202 and generates power which can be fed via inverters 320 into the distribution grid 300.

This diesel engine 403 of the above-mentioned emergency power system 208 drives a generator 423, so that the internal combustion engine-generator unit 420 comprising the diesel engine 403 and the generator 423 serves as an emergency power unit for the electrical system 209 of the mega-yacht. In the present case, the above-mentioned internal combustion engine-generator units 400 are already embodied for different power output at suitable engine speeds. For example, an internal combustion engine 401, 402 of a primary drive serves to generate a power output of approximately 3500 kW at approximately 2050 rpm, while the diesel engine 403 supplying the emergency power unit is designed to generate approximately 730 kW at approximately 1500 rpm. In the present case, additional (here four) internal combustion engine-generator units, shown in the upper area, are connected via inverters 330 (AC/DC inverters) to the distribution grid 300 in the form of a combination of a diesel engine 405, 406, 407, 408 with respectively one generator 425, 426, 427, 428. Although the inverters 330 in the present case are shown separately, within the scope of a modification for the operation of the respective generator 425, 426, 427, 428 of an internal combustion engine-generator unit 430, as an aggregate they may be necessary and thus they are then allocated to said aggregate. This may relate e.g. to providing the excitation and the idle power required for the generator, e.g. in asynchronous machines or in hybrid-excited permanent magnet-synchronous machines.

The internal combustion engines of the aggregates shown are designed for a power output of approximately 2880 kW at approximately 2050 rpm. In the present case therefore at least three groups of internal combustion engine-generator units 410, 420, 430 with different power output and engine speeds can be connected to the distribution grid 300 via switches, not marked in greater detail.

The generator 423 of the internal combustion engine-generator units 420 serving as an emergency generator is however connected to the distribution grid 300 only in exceptional situations, i.e. practically never. The circuit of FIG. 1 explained here allows it in theory, but a parallel operation of the emergency generator of the internal combustion engine-generator unit 420 and the primary generators of the internal combustion engine-generator units 410, 430 is practically intended only for re-synchronization.

Furthermore, land connections 440 can be connected to the distribution grid 300 via additional inverters 340 for the purpose of supplying electric power.

Overall, in FIG. 1 a relatively complex internal combustion engine-generator system 1000 with a plurality of internal combustion engine-generator units 410, 420, 430, generating power that can be connected to a distribution grid 300, here in the form of diesel generator units, is connected to form a power generation aggregate and/or electro-mechanic drives. Additionally, a plurality of load consumers 200 consuming power are connected to the distribution grid 300. The above-mentioned unit 410, 420, 430 comprises in the present case different internal combustion engines 401, 402, 403 and 405-408 in combination with respectively one generator 421, 422, 423 and 425-428.

All internal combustion engines described (if applicable except for the emergency generator 420) represent diesel engines, which are designed as diesel engines with variable engine speeds and which are therefore controlled electronically.

Figure 2:
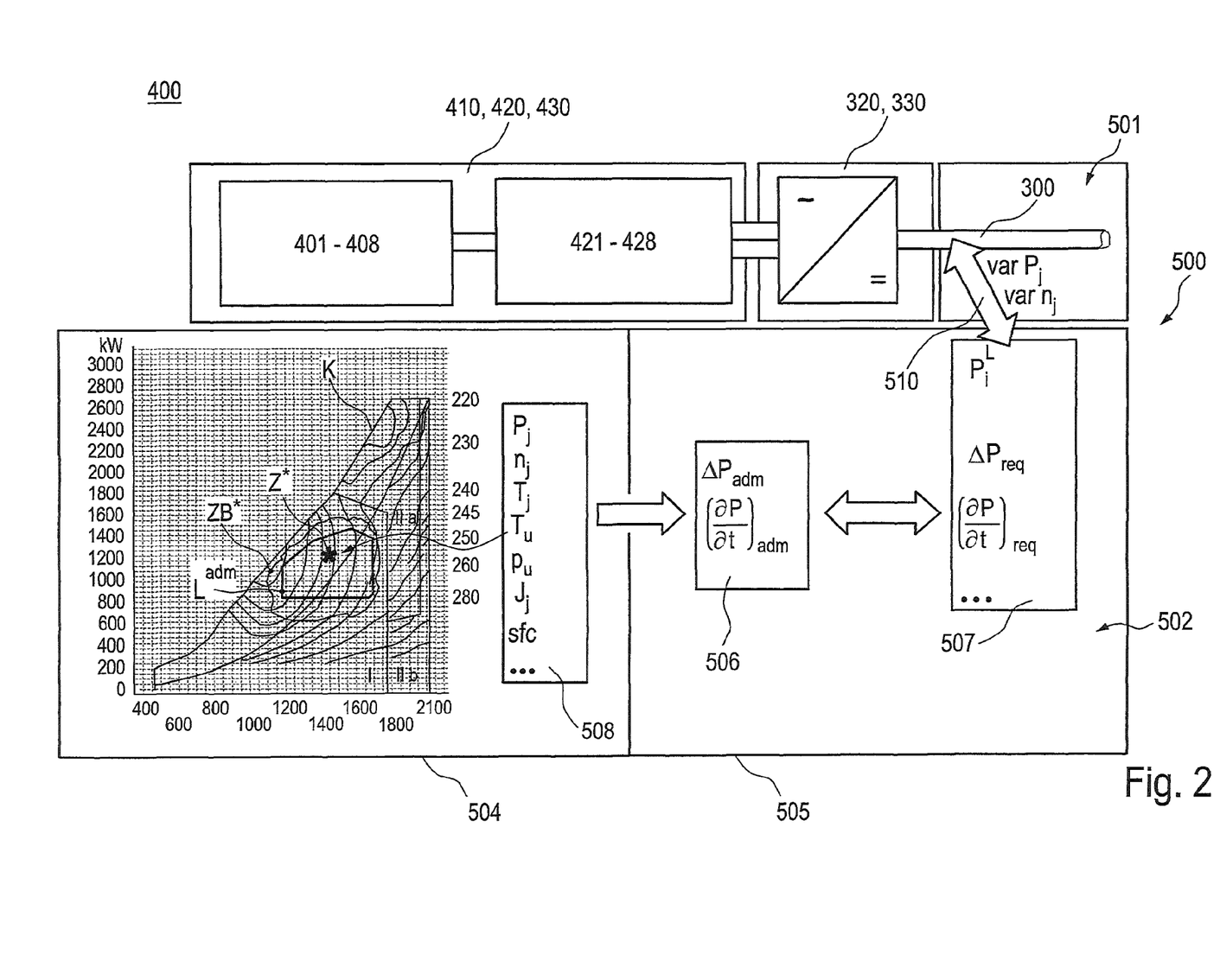
FIG. 2 a schematic illustration of the general concept of an exemplary illustration of the control and regulating method for the internal combustion engine-generator system, for example the one in FIG. 1, with a schematic illustration of the internal combustion engine-generator unit as well as a first and second partial control, with the operating state Z* and the electric load override $L^{adm}$ of an internal combustion engine-generator unit being deducted within the scope of a calculation model and exemplary parameters for characterizing the electric load override $L^{adm}$ being compared with exemplary parameters for characterizing the load requirements of a total of load consumers.
Figure 3:
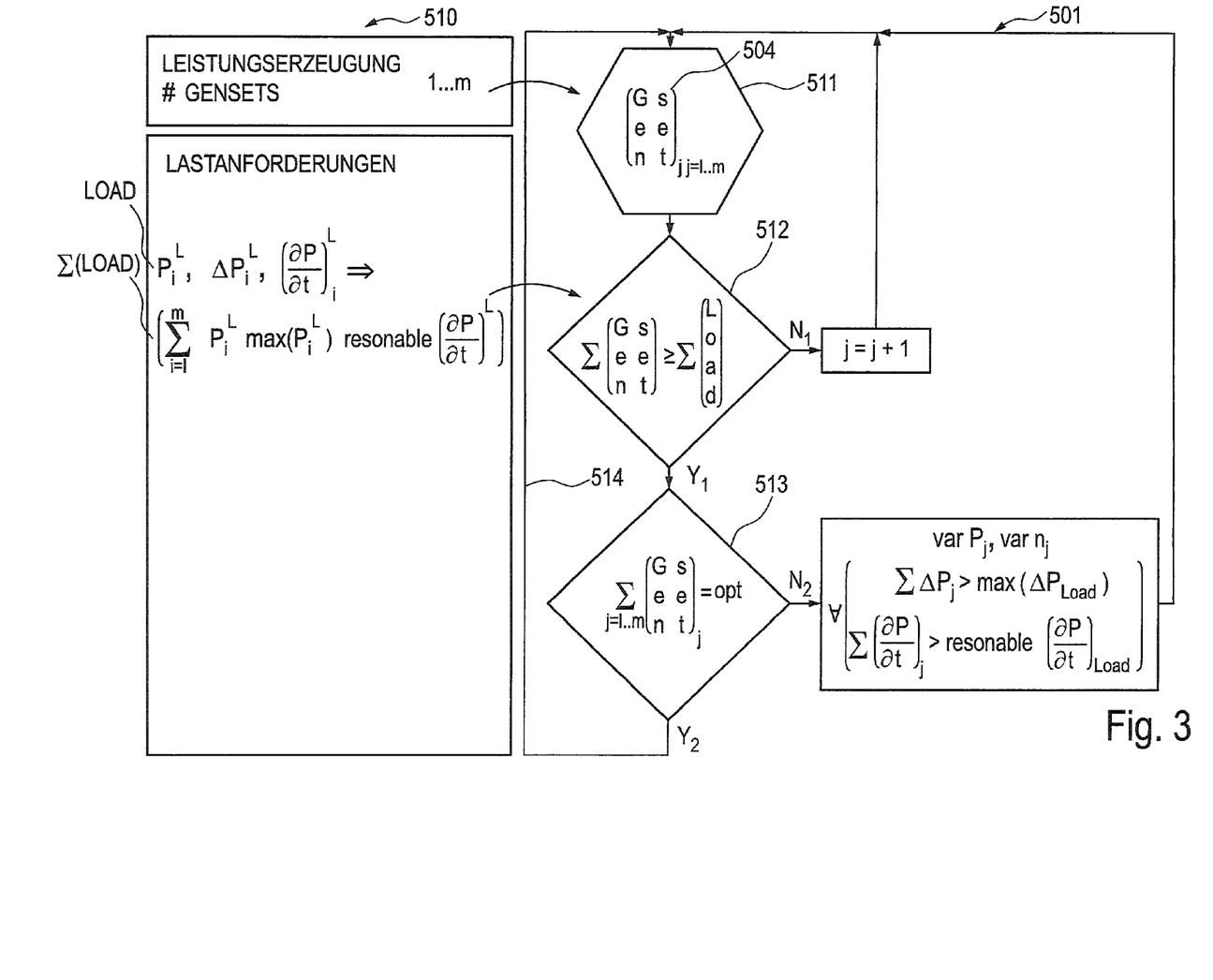
FIG. 3 for the exemplary illustration of FIG. 2, a schematic illustration of a control circuit for a first superseding partial control regarding the system in order to determine the number of internal combustion engine-generator units to be connected as well as the load distribution and the distribution of engine speeds.
Figure 4:
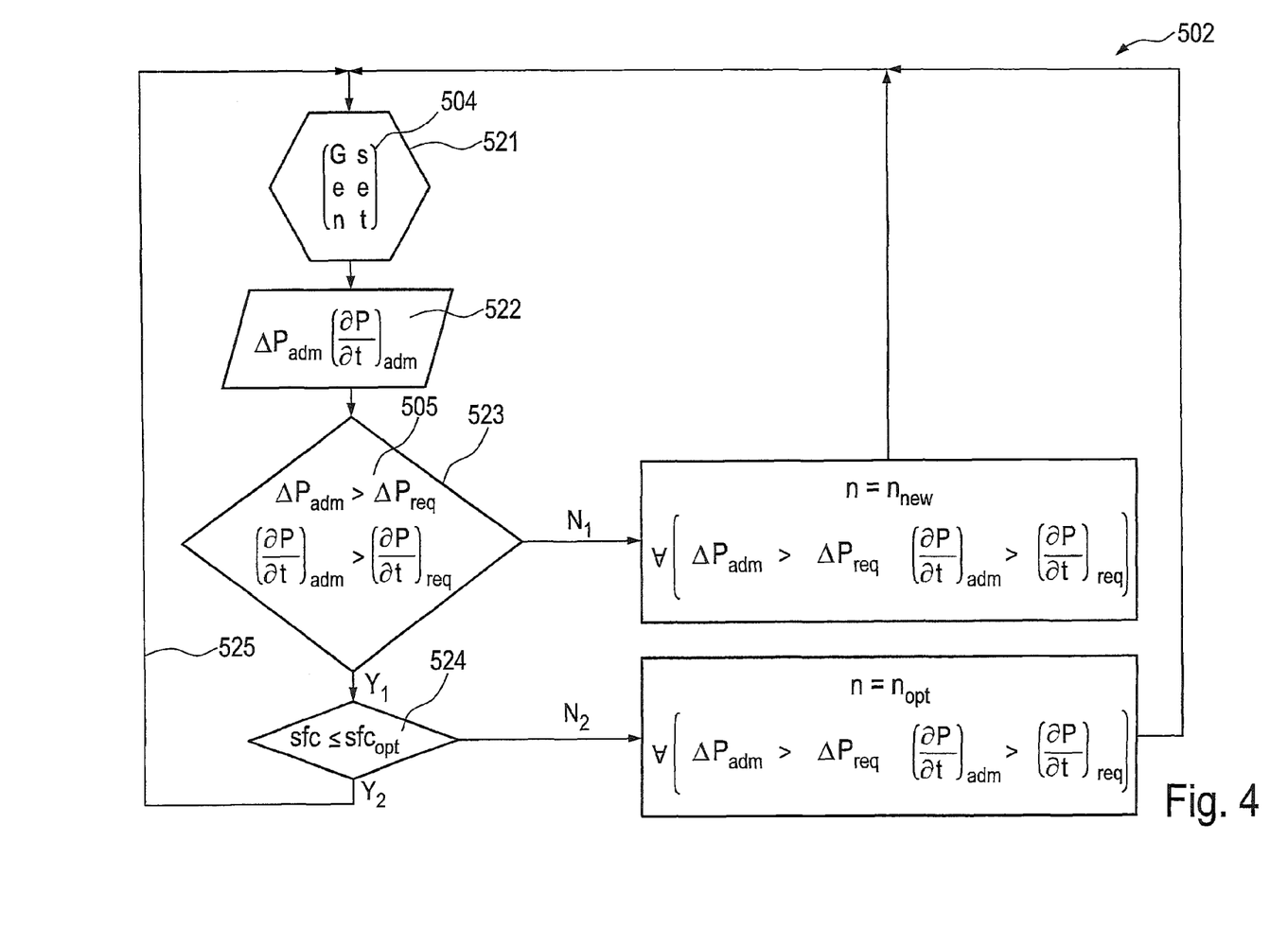
FIG. 4 for the exemplary illustration of FIG. 2, a schematic illustration of a control circuit for a second partial control concerning the internal combustion engine with variable engine speeds, particularly for comparing the electric load override with the variable load distribution depending on the load requirements and an adjustment of the engine speed of the internal combustion engine depending thereon.

With reference to the following FIGS. 2 to 4, a control and regulating unit is described within the scope of an exemplary illustration in the context with a method for controlling and regulating according to one aspect of the exemplary illustrations.

For this purpose, one concept of the exemplary illustrations is generally explained based on FIG. 2 using as an example the illustrated diesel engine-generator unit 400 as a part of the internal combustion engine-generator system 1000. The unit 400 comprises a diesel engine 401-408 as the internal combustion engine and a generator 421-428 as the generator, and the unit 400 is connected via an inverter 320 and/or inverter 330 to the distribution grid 300.

A control and regulation unit 500 is also provided with access to the distribution grid via a first partial control 501 and a second partial control 502, which is explained in greater detail using FIG. 3. The first partial control 501 shown in FIG. 3 in greater detail is a superseding partial control and relates to a system level, i.e. here the fundamental control parameters are regulated, namely in the present case the plurality of the internal combustion engine-generator units 410, 430 to be connected to the distribution grid 300 depending on the load requirements and the variable load distribution and the distribution of engine speeds.

The second partial control 502, explained in greater detail in FIG. 4, at the level of the diesel engine comprises a digital signal processor to illustrate a calculation model 504 showing one of the diesel engines 401 to 408, and a comparator 505 to execute comparing inquiries between the parameters of an electric load override 506 and parameters of a variable load distribution 507 depending on the scope of load requirements. The control values and parameters 508 yielded here for describing an operating state Z*, namely here particularly the engine speed $n_J$ and the variable power output $P_J$, are provided via an interface 510 to the first partial control 501. The interface 510 simultaneously forms an interface to the distribution grid 300, with all power output and load changes being available to it.

In the present case, each of the diesel engines 401, 402, and 403-408 shows a second partial control 502 with a digital signal processor to display the calculation model 504. The second partial control 502 implements a model-based controller here, which calculates from the given operating state Z*, determined from the given parameter field K, potential load changes within a range of operating states ZB*, which the engine can assume. In the illustration of FIG. 2 it is assumed that the engine is operated presently in the map at the operating state Z* with the power output $P_J$ of the internal combustion engine, the engine speed $n_J$ of the internal combustion engine. A vector of various parameters 508, for example the operating temperature of the engine $T_J$, the ambient temperature $T_U$, the air pressure $p_U$, and the moment of inertia J, as well as the specific fuel consumption "sfc" of the internal combustion engine-generator unit 410, 420, 430 or other parameters " . . . " which can be optimized, such as an exhaust counter-pressure $p_{AG}$, here largely determines the permitted transient load changes $L^{adm}$ within the range of operating states ZB*, which the engine can assume with sufficient reserves. Here the so-called electric load override 506 is characterized in the present case by a value of a permitted power leap $\Delta P_J^{adm}$ in reference to the given operating state Z* and a permitted power ramp $\delta P_J^{adm}$ in reference to the given operating state Z*. In the thermodynamic calculation model 504 the limits of this permitted electric load override $L^{adm}$ are shown as a parameter range with a bold frame. The digital signal processor of the first partial control 502 determines here, by simulating the transient behavior of an engine, i.e. the diesel engine of the internal combustion engines 401, 402 and 405-508, a given operating state Z* and deducts therefrom a permitted electric load override $L^{adm}$ depending on the given operating state Z*, which is maximally equivalent to the range of operating states ZB*. The above-mentioned parameters 508 shall not be considered a complete list of the parameters defining the operating state Z* and/or the range of operating states ZB* and/or the permitted electric load override $L^{adm}$. Depending on the calculation expense and the requirements, a small or large number of parameters 508 can be selected in order to sufficiently describe an engine in the calculation model. The calculation model on the digital signal processor for example can be integrated in the diesel engine itself. However, it may also be executed in an external computer and provided to the control and regulation device 500.

The permitted load changes within the scope of an energy load override 506 must be equivalent to the frame work for load parameters required for engine speeds and load distributions at the interface 510 to the distribution grid 300 and/or to the first partial control 501. In the present case the load requirement and the load distribution 507 of the load consumers 201, 202, 203, 204, 205, 206, 207, and perhaps 208, 209 connected thereto are determined by appropriate effective loads $P_J^L$, load leaps $\Delta P_J^L$, and load ramps $\delta P_J^L$. They are converted within the scope of the first partial control 501 into requested loads of a scope of load requirements $\Delta P^{req}$ and $\delta P^{req}$.

As a result here, the given status Z* and thus its capacity to accept load changes can be calculated at any time online and in real time by the calculation model 504 stored in the control with the characteristics K of the diesel engine. This allows controlling the diesel engine depending on the expected load changes at an optimal operating point. In internal combustion engine-generator units with variable engine speeds, as provided in the present case here the units 410, 430, perhaps also 420, the same power output can be provided at different engine speeds, which has considerable influence upon the fuel consumption and the electric load override. In maximally occurring load leaps $\Delta P_{req}$ and load ramps $\delta P_{req}$ of prior art, when using the calculation model 504, range of power output, and range of engine speeds can be calculated for the electric load override $L^{adm}$, which on the one hand ensures safe operation because it lies within the potential range of operating states ZB*. On the other hand, within this permitted electric load override $L^{adm}$ an optimal operating point can be determined, if applicable depending on a selected optimization strategy. Due to the fact that both the maximal load change depends on the present operation and the energy load override of the diesel engine on the given operating conditions, the control 500 is performed constantly with the calculation model 504 in a control circuit. This is explained based on the following FIGS. 3 and 4.

FIG. 3 shows the design of a first superseding partial control with control and processor means regarding the system 1000.

The interface 510 described in FIG. 2 initially shows, as an essential statement regarding power generation, the number of available internal combustion engine-generator units 400, in the following also called #GENSETS. In the present case this represents the gensets marked in FIG. 1 comprising the internal combustion engines of the units 410 and 430; here a number of six gensets. Furthermore, information is provided at the interface 510 for potential load changes of the load consumers. Here, the load consumers marked in FIG. 1 are used, particularly the propellers 201, 202, 203, 204, 205, as well as the additional load consumers 207 to 209. The load requirements are described within the framework of a scope of load requirements for each load consumer. In the present case they are the effective load $P_I$, a load leap $\Delta_I$, and a load ramp $\delta P_I$. The first partial control 501 engaging the interface 510 determines therefrom a scope of load requirements, which in the present case is determined with relatively little expense by the sum of the effective loads $P_I^I$, a maximum of the load leaps $\Delta P_I^I$, and a superseding value of the load ramps $\delta P_I^{resbl}$. The latter may for example also occur as a formation of maximum values or as an upper limit or an upper average of all load ramps.

In the first partial control 501 itself, then first in a step 511, based on the calculation model 504, the operating states Z* and the status parameters 508 and/or the potential range of operating states ZB* describing them are provided. This information generally allows the statement of power output available at a transient operating state as well as all energy load overrides of the plurality of internal combustion engines available based on the calculation model 504. In a step 512 it is compared if the sum of all energy load overrides and the power output of the internal combustion engines available is greater than the scope of load requirements of the plurality of load consumers as provided via the interface 510 to the first partial control. In the event this is not the case, in an $N_1$-branch of the first partial control 501, the number #GENSET of gensets is increased by "1" and the steps 511 and 512 are performed anew until the above-described condition in step 512 is fulfilled. In a step Y1, it is then checked if the status parameters provided by the available gensets are optimized. This is not the case if the summary framework condition mentioned in the second $N_2$-branch of the first partial control is not fulfilled. Concretely, it is checked if the sum of all individually possible load leaps $\Delta P_J$ is greater than a maximum of load leaps for the system 1000. It is also checked if the maximum of all individually possible load ramps $\delta P_J$ is representative as a superseding value for the expected load ramps $\delta P_I$ for the system 1000 or if an appropriately adjusted higher value must be used. The variable load distribution and distribution of engine speeds var ($P_J$) var ($n_J$) of a requested load distribution and distribution of engine speeds for an individual genset is adjusted within the $N_2$-branch of the first partial control 501 until this summary framework condition is fulfilled. Ultimately this leads to the system 1000 being able at the system level to fulfill any reasonably expected load leap and/or any reasonably expected load ramp of the load consumers even in transient operation. In particular, in a $Y_2$-branch of the first partial control 501, the above-stated steps 511 (determining the operating state Z* and range of operating states ZB*), 512 (determining the number of units 400 to be connected), 513 (optimizing with regards to the summary framework conditions) are performed continuously, i.e. "in the loop". Both a maximum load change MAX ($\Delta P^I$) as well as the load capacity ZB* depend on the given operating state Z*. By the continuous operation it is ensured that on the superseding control level for the system 1000 of the internal combustion engine-generator system, a secure and simultaneously optimal operating state is given.

The summary framework condition defined in the $N_2$-branch and shown in FIG. 3 leads to a value of a variable load distribution var$^P_J$, allocated to the requested unit 400, in reference to the given operating state Z* and variable distribution of engine speeds $n_J$. These variable load distributions for an individual internal combustion engine 400, depending on the scope of load requirements, are characterized as requested load leap $\Delta P_J^{req}$ and requested load ramp $\delta P_J^{req}$ and provided to the second partial control 502 described in greater detail in FIG. 4.

As shown in FIG. 4, in the step 521 the second partial control 502 relating to the internal combustion engine with variable engine speeds is also provided with the results of the calculation model 504, namely the operating state Z* and the range of operating states ZB*.

As discernible from FIG. 2, a permissible range of an electric load override $L^{adm}$ can be stated from the range of operating states ZB*. In the present case, it is defined by a permitted power leap $\Delta P_I^{adm}$ and a permitted power ramp $\delta P_I^{adm}$ in reference to the given operating state Z*; this determination is also applicable in a transient operation of the internal combustion engine 400, which is shown in step 522 for the second partial control in FIG. 4. In the step 523 of the second partial control 502, the above-mentioned parameters of the permitted energy load override $\Delta P_{adm}$, $\delta P_{adm}$ are compared to the variable parameters of the load distribution $\Delta P_{req}$ $\delta P_{req}$ dependent on the scope of load requirements. In the event the values for the requested load are not within the permitted electric load override $L^{adm}$, in a first $N_1$-branch of the second partial control 502 an engine speed $n_{new}$ of the internal combustion engine is adjusted by way of repeating the above-stated steps 521, 522, 523 until the condition listed in step 523 is fulfilled. If this is the case it can be assumed that, at least with regards to the load requirements and the available electric load override of the internal combustion engine, the operating state Z* of the internal combustion engine is safely selected.

In a branch Y1, in the second partial control 502, it is then checked if all status parameters of the internal combustion engine which can be optimized meet another framework condition. For example an optimizing strategy may include consuming as little fuel as possible in the internal combustion engine. In this case an optimizing parameter includes operating the internal combustion engine in a range with as little specific consumption as possible (sfc as low as possible). If the previously selected engine speed $n_{new}$ fails to meet the optimized requirements, then in a second $N_2$-branch of the second partial control the engine speed n is optimized until it is equivalent to optimal engine speeds $n_{opt}$, although the conditions mentioned in step 523 must be fulfilled nonetheless. This means, even at optimal engine speeds the internal combustion engine subject to the second partial control 502 can show an electric load override which is greater than the variable load distribution for the internal combustion engine depending on load requirements.

If an optimized engine speed $n_{opt}$ is given for the internal combustion engine, the second partial control will be continuously operated "in the loop" in a second $Y_2$-branch by repeating the above-mentioned steps 521 to 524. The rate of repetitions of the steps 521 to 524 can be selected according to the dynamic of the transient states of the internal combustion engine, so that it is ensured that both in rapid as well as in slow dynamic transient status changes the above-mentioned secure and optimal operating conditions of the internal combustion engine are fulfilled.

In particular when executing the second partial control 502, the operating state Z* and the range of operating states ZB* of the step 521 for the internal combustion engine are forwarded to the step 511 of the first partial control 501 so that the superseding first partial control 501 also can newly determine the power requirements, if applicable, and feed it to the second partial control 502 with feedback to the step 523. In the normal case of a deficit on the generator side, as explained, either another aggregate is started within the scope of the $N_1$-branch of the first partial control 501. Otherwise, if for example all aggregates have already been started, the aggregates operating in the operating state Z* must be run such that the potentially requested change of load of step 523 of the second partial control 502 can be implemented.

In the event that the execution of the $N_1$-branch of the second partial control 502 fails to lead to a conclusive result, it must be assumed that the requested power output cannot be provided. In order to render such a determination, additional tests may be required so that only in exceptional cases and as the last option it may be considered to allow load shedding, which may provide for shutting off consumers unimportant for the acute driving situation of the megayacht. This may comprise for example shutting off consumers at the inverters 310. This may also comprise for example shutting off consumers at the inverters 320. Additionally or alternatively, any starting of additional consumers may be blocked as well.

In the present exemplary illustration, an error scenario is also considered in which, in case of malfunction, the internal combustion engines 401 to 408 (except for 403, perhaps) representing diesel engines with variable engine speeds are operated as engines with constant engine speed, as is the case in gensets of prior art.

In one aspect, the exemplary illustrations offer the advantage that, if at all, only a targeted load shedding of more or less critical consumers is required, because within the scope of the calculation model 504 and the processing steps 511 and 521 a constant simulation is implemented even of a transient state of the diesel engine.

The invention claimed is:

1. A method for controlling and regulating an internal combustion engine-generator system including a plurality of internal combustion engine-generator units configured to generate electric power for a plurality of load consumers wherein each of the plurality of internal combustion engine-generator units comprises an internal combustion engine with variable engine speeds and a generator, the method comprising:
    (a) determining a given operating state of the internal combustion engine of at least one internal combustion engine-generator unit;
    (b) deducting a range of operating states describing electric load override depending on the given operating state for the internal combustion engine of the at least one internal combustion engine-generator unit, with the determination of the given operating state and the deduction of the range of operating states occurring based on a calculation model for the internal combustion engine of the at least one internal combustion engine-generator unit; and
    (c) providing a range of load requirements describing potential load requirements for the plurality of load consumers;
    wherein step (c) is performed in a first superseding partial regulation, and steps (a) and (b) are performed in a second partial regulation.

2. A method according to claim 1, wherein
    (d) in consideration of the given operating state and the electric load override of the internal combustion engine of at least one internal combustion engine-generator unit:
        the plurality of internal combustion engine-generator units is determined depending on a load requirement;
        at least one of a variable load distribution and a variable distribution of engine speeds is determined for the plurality of internal combustion engines depending on the load requirement.

3. A method according to claim 1, wherein when deducting the range of operating states, a permitted operating range of a generator of the internal combustion engine-generator unit is considered.

4. A method according to claim 2, wherein step (d) is performed in the first superseding partial regulation.

5. A method according to claim 1, wherein the first superseding partial regulation relates to the system and the second partial regulation relates to the internal combustion engine of the at least one internal combustion engine-generator unit.

6. A method according to claim 1, wherein
    the electric load override at a given operating state is characterized by at least two parameters describing a transient development of a power output.

7. A method according to claim 2, further comprising:
    e) comparing the electric load override with the variable load distribution depending on the scope of load requirements for the internal combustion engine, in the second partial regulation, the second partial regulation relating to the internal combustion engine of the at least one internal combustion engine-generator unit.

8. A method according to claim 2, wherein
    at least one of the variable load distribution and the distribution of engine speeds are subjected to a summary framework condition, with the sum of all energy load overrides of the internal combustion engines based on the calculation model for at least one internal combustion engine being greater than the scope of load requirements of the total of load consumers.

9. A method according to claim 6, wherein
    a scope of load requirements of the total of load consumer is determined by at least one of a sum of effective loads, a maximum of load leaps, and a superseding value of the load ramps.

10. A method according to claim 8, wherein the summary framework condition is formed such that:
    a sum of all power leaps that can be shown is greater than a maximum of power leaps of the total of load consumers; or
    a sum of all individual power ramps that can be shown is greater than a superseding value of the load ramps.

11. A method according to claim 1, wherein
    the engine speed and the power of the internal combustion engine can be adjusted via the second partial regulation.

12. A method according to claim 1, wherein
    the calculation model is a thermo-dynamic model of the operating state of the internal combustion engine based upon a plurality of parameters, the plurality of parameters selected from a group comprising:
    power output of the internal combustion engine,
    engine speed of the internal combustion engine,
    temperature of the internal combustion engine,
    ambient temperature,
    ambient pressure,
    exhaust counter-pressure,
    moment of inertia of the internal combustion engine-generator unit, and
    specific fuel consumption.

13. A method according to claim 1, wherein
    a determination of a plurality of internal combustion engine-generator units occurs depending on the load requirement by comparing a total load of the consumers to the total power output of the internal combustion engines-generator units.

14. A method according to claim 1, wherein an engine speed of the internal combustion engine and/or another parameter characterizing the operating state is changed:
    if an amount of a variable load distribution allocated to the requested unit is outside the permitted range of operating states describing the electric load override of the internal combustion engine in reference to the given operating state, or if another not yet optimized parameter of the calculation model is given.

15. A method according to claim 1, further comprising providing an optimization strategy, for at least one of the first and second partial regulations, wherein a new operating state of the internal combustion engine is adjusted within a range of operating states.

16. A method according to claim 15, wherein the range of operating states is deducted repeatedly for changes of the operating state, wherein at least one of the first partial regulation and the second partial regulation comprises a control circuit in which the range of operating states is repeatedly deducted.

17. A device; configured to control and regulate an internal combustion engine-generator system including a plurality of internal combustion engine-generator units configured to generate electric energy for a plurality of load consumers, wherein each of the plurality of internal combustion engine-generator units comprises an internal combustion engine with variable engine speeds and a generator, the device comprising:
   a processor including a first superseding partial regulation and a second partial regulation, the processor configured to:
   (a) determine a given operating state of the internal combustion engine of at least one internal combustion engine-generator unit;
   (b) deduct an electric load override depending on a range of operating states describing the given operating state for the internal combustion engine of at least one internal combustion engine-generator unit, with the determination of the given operating state and the deduction of the range of operating states occurring based on a calculation model for the internal combustion engine; and
   (c) provide a scope of load requirements describing potential load requirements of the plurality of load consumers;
   wherein the second partial control relates to the internal combustion engine of the at least one internal combustion engine-generator unit and is configured to execute steps (a) and (b), and the first superseding partial control relates to the system and is configured to execute step (c).

18. A device for controlling and regulating according to claim 17, wherein the processor is configured to:
   (d) determine a number of internal combustion engine-generator units to be connected to the distribution grid depending on the scope of load requirements, and
   determine at least one of a variable load distribution and a variable distribution of engine speeds to the plurality of internal combustion engines of the plurality of internal combustion engine-generator units depending on the scope of load requirements,
   in consideration of the given operating state and the electric load override of the internal combustion engine of at least one internal combustion engine-generator unit.

19. A device for controlling and regulating according to claim 17, the second partial control comprising a second processor configured to execute the portions (a) and (b), the device further comprising a first processor configured to execute the portion (c).

20. An internal combustion engine-generator system, comprising:
   a plurality of internal combustion engine-generator units configured to generate electric power for load consumers, wherein each of the plurality of internal combustion engine-generator units includes an internal combustion engine with variable engine speeds and a generator, and
   a device for controlling and regulating according to claim 17.

21. A land vehicle, watercraft, or a stationary facility configured to generate electric energy, comprising:
   an internal combustion engine-generator system according to claim 20.

22. A method according to claim 1, further comprising adjusting an operating point of at least one of the internal combustion engines based at least upon the determinations in steps (a), (b), and (c).

23. A method for controlling and regulating an internal combustion engine-generator system including a plurality of internal combustion engine-generator units configured to generate electric power for a plurality of load consumers configured to consume electric power, wherein each of the plurality of internal combustion engine-generator units comprises an internal combustion engine with variable engine speeds and a generator, the method comprising:
   (a) determining a given operating state of the internal combustion engine of at least one internal combustion engine-generator unit;
   (b) deducting a range of operating states describing electric load override depending on the given operating state for the internal combustion engine of the at least one internal combustion engine-generator unit, with the determination of the given operating state and the deduction of the range of operating states occurring based on a calculation model for the internal combustion engine of the at least one internal combustion engine-generator unit; and
   (c) providing a range of load requirements describing potential load requirements for the plurality of load consumers, wherein step (c) is performed in a first partial regulation relating to the internal combustion engine-generator system, and steps (a) and (b) are performed in a second partial regulation relating to the internal combustion engine of the at least one internal combustion engine-generator unit.

24. A method according to claim 23, wherein the first partial regulation is a superseding regulation.

25. A method according to claim 23, further comprising providing first partial regulation information to the second partial regulation.

26. A method according to claim 25, further comprising determining a number of required internal combustion engine-generator units from at least (a) the range of load requirements describing potential load requirements for the plurality of load consumers and (b) the first partial regulation information.

27. A method according to claim 23, further comprising adjusting an operating point of at least one of the internal combustion engines based at least upon the determinations in steps (a), (b), and (c).

* * * * *